Sept. 15, 1942.    W. L. MAXSON ET AL    2,295,997
VARIABLE RATIO GEARING
Original Filed Nov. 30, 1936    3 Sheets-Sheet 2
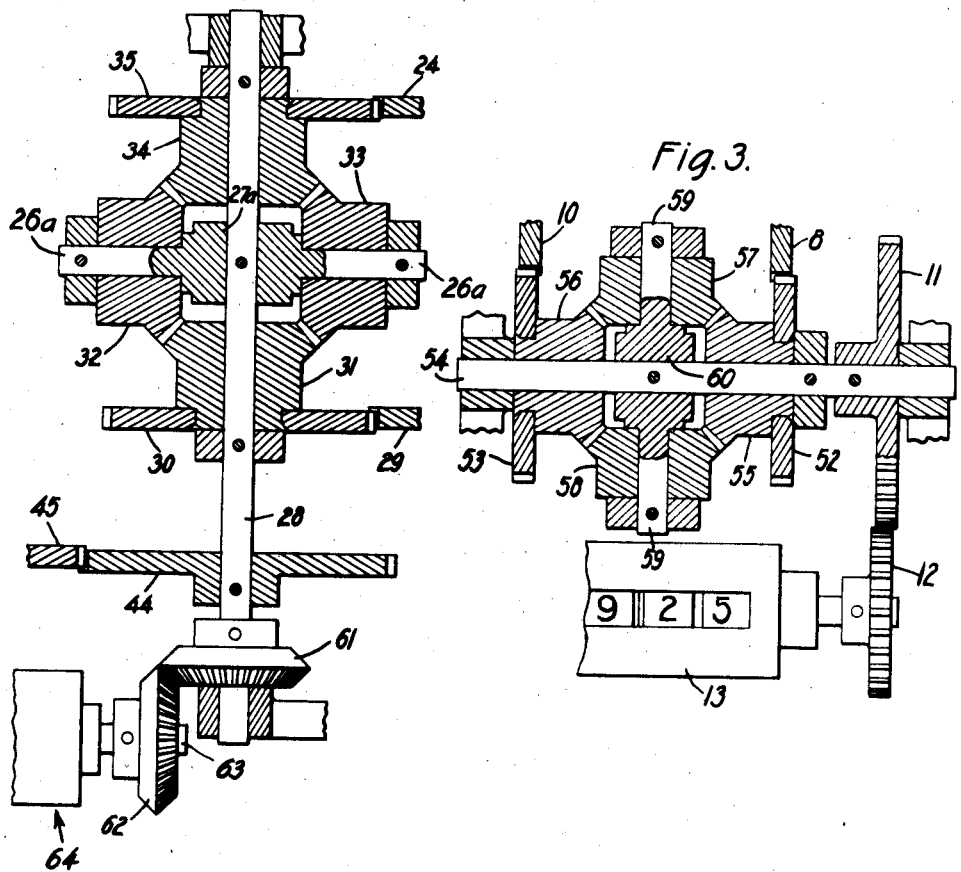

Sept. 15, 1942.   W. L. MAXSON ET AL   2,295,997
VARIABLE RATIO GEARING
Original Filed Nov. 30, 1936   3 Sheets-Sheet 3

Patented Sept. 15, 1942

2,295,997

UNITED STATES PATENT OFFICE 2,295,997

VARIABLE RATIO GEARING

William L. Maxson, South Orange, N. J., and Peter J. McLaren, New York, N. Y., assignors, by mesne assignments, to Reconstruction Finance Corporation, New York, N. Y., a corporation of the United States of America Original application November 30, 1936, Serial No. 113,398, now Patent No. 2,194,477, dated March 26, 1940. Divided and this application May 29, 1939, Serial No. 276,280

3 Claims. (Cl. 74—424.5)

This invention relates to functional apparatus and has for its object the provision of an apparatus responsive to the input of a basic variable which may have a minimum absolute value of zero, for producing an output whose value constantly represents a predetermined, non-linear function of the basic variable.

It is a further object of the invention to provide a functional apparatus which is capable of constantly producing an output of the kind referred to in response to a basic input variable which is either positive or negative, and which increases or diminishes to and through a value of zero.

It is a further object of the invention to provide an apparatus of the kind referred to which is simple and compact and, therefore, economical to manufacture, and which is also dependable in operation. In accordance with a practical and advantageous embodiment, the apparatus is desirably arranged to respond to the input of a variable quantity, either positive or negative, to produce as a constant output the square of the quantity put in.

To this end provision is made of a functional gear adapted to be operated in proportion to the value of the input quantity and having teeth arranged at uniform intervals along a spiral path which runs to or nearly to the center of the gear. The spirally disposed teeth are arranged to engage the teeth of a follower crown gear whose axis is at right-angles to that of the spiral gear, and to drive the follower gear rotatably and axially in either direction. The spiral path is so chosen that the total rotation of the crown gear away from a datum or zero condition is constantly proportional to the square of the total rotation of the spiral gear away from its datum or zero condition.

In order that this kind of result may be secured, the radius of each point on the spiral path is made proportional to the rate of change of the dependent variable (in this instance the square of the basic variable) with respect to the rate of change of the basic or input variable. Thus, in the illustrative case where the square of the basic variable is wanted as an output, the radius of each point on the spiral is made proportional to the angular departure of that point from the datum point of the spiral path, such point being located at the center of the spiral gear.

Other objects and features of the invention have to do with the construction and arrangement of the spiral gear and the crown gear for securing practical operation to the zero condition. For reasons which will be made clear in the detailed description of the illustrative apparatus, the innermost tooth of the spiral is not located at the center of the spiral gear, but at a distance from the center which is desirably equal to one-quarter of the distance between adjacent turns of the spiral. Neither is the axis of the follower gear disposed in intersecting relation to the axis of the spiral gear, but it is offset from the spiral gear axis to the same extent that the first tooth of the spiral gear is offset. The reason for this relationship and the importance of it from a practical point of view will be made clear in connection with the detailed description of these parts.

The present application is a division of our pending application Serial No. 113,398, filed November 30, 1936, for improvement in Multiplying machines, now Patent No. 2,194,477. In that application disclosure is made of a multiplying apparatus embodying two squaring gears in such manner that the input to one squaring gear is the sum of two quantities whose product is wanted, and the input to the other squaring gear is the difference of those quantities. The outputs of the squaring gears are, respectively, the square of the sum of the quantities and the square of the difference of the quantities. Through further mechanism these outputs are subtractively combined, and the difference is divided by 4, so that the indicated result is the product of the two quantities. The points should be noted that in this kind of apparatus the basic or input variable to one of the squaring gears is the sum of the multiplicand and the multiplier, while the basic or input variable to the other of the squaring gears is the difference of the multiplicand and of the multiplier. These inputs are secured by first running the multiplicand positively into both squaring gears and then running the multiplier positively into the first squaring gear and negatively into the second.

It will be noted with respect to the second squaring gear that, if the multiplier exceeds the multiplicand in value, the basic variable put into the second squaring gear diminishes in value as the multiplier is run in, passes through zero, and has a final negative value. Since the square of any real number is positive, whether the number be positive or negative, the output from the second squaring gear should be the same for the same absolute input value regardless of the sign of the latter. It is an important feature of the present invention that means are provided for reversing the direction of input to the second squaring gear as the value of the input passes through zero. The desirability for reversal is also present with respect to the first squaring gear of the illustrative mechanism, when the apparatus is used in connection with a negative multiplicand, or with a positive multiplicand and with a negative multiplier which exceeds the multiplicand in value.

Other objects and advantages will hereinafter appear.

In the drawings forming part of this specification and illustrating a practical and advantageous embodiment of the invention:

Fig. 2 is a fragmentary view in vertical section illustrating differential mechanism employed in the left hand train, which subtracts the numbers, the other train also including a similar differential mechanism;

Fig. 3 is a fragmentary view in sectional elevation illustrating the differential mechanism for differentially combining the squares;

Fig. 4 is a fragmentary sectional detail view showing a portion of one of the squaring devices;

Figure 1:
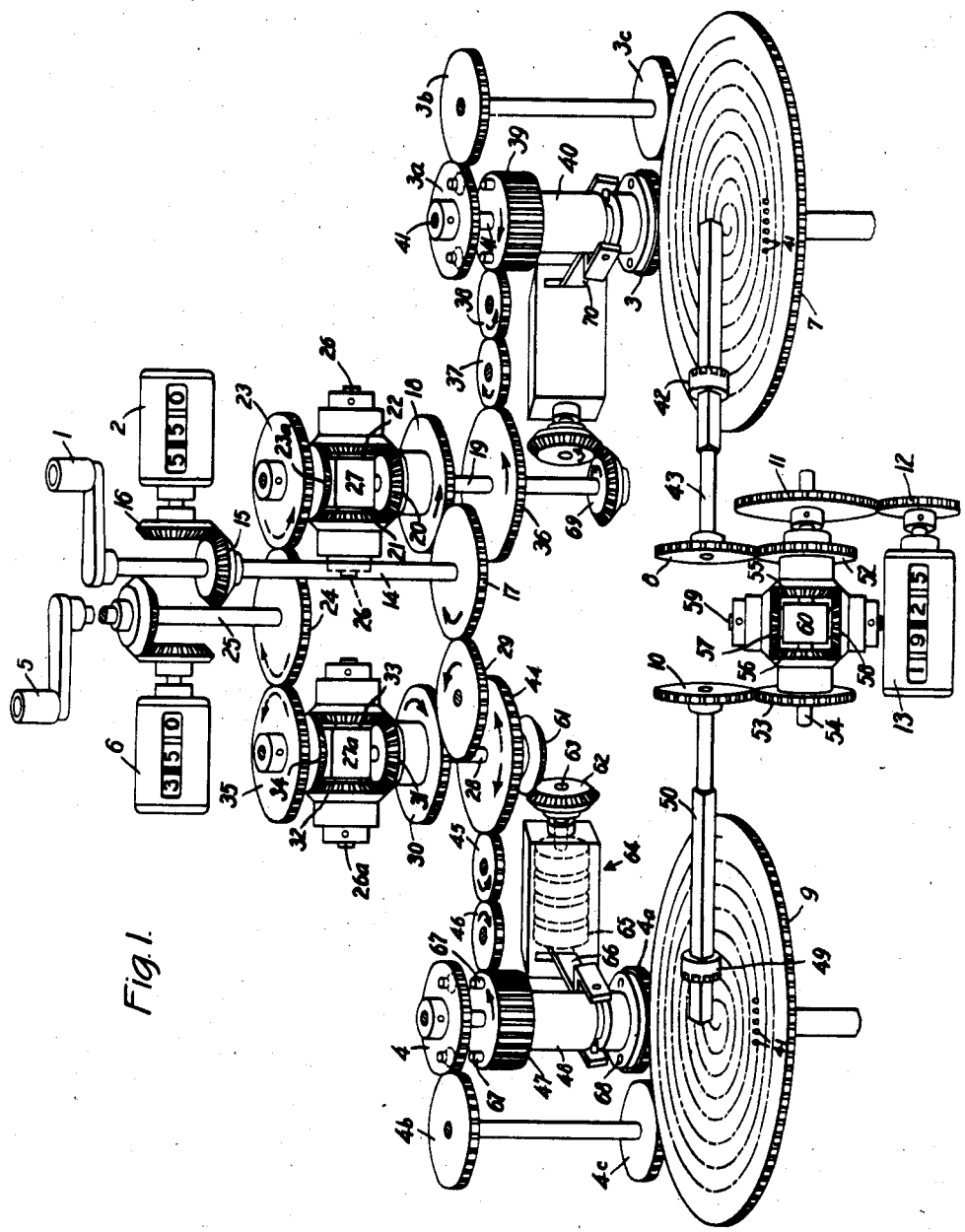
Fig. 1 is a fragmentary, perspective view illustrating the principal parts of the apparatus the reversing mechanism of the right hand train being shown in the positive position and the reversing mechanism of the left hand train being shown in the negative position.
Figure 5:
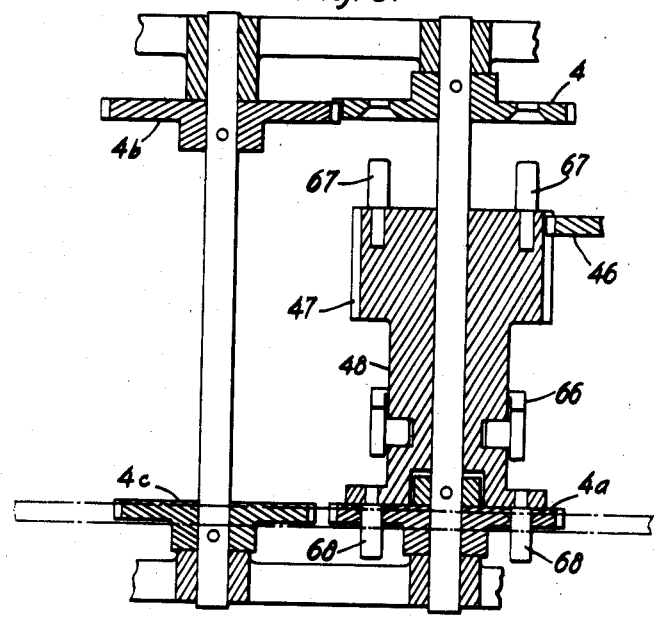
Fig. 5 is a fragmentary view in sectional elevation showing details of a reversing clutch.

Before the parts are described in detail the major elements will be referred to for the purpose of following through the principle of the invention.

An operator, as handle 1, is turned to run the multiplicand into a counter 2. Through suitable gearing this forward rotation of the handle 1 runs a gear 3 of the sum train forward and also runs a gear 4 of a difference train forward. (The gear 4 is shown disconnected in Fig. 1 but it would be effective during the running in of a positive multiplicand.)

A second operating handle 5 is turned forward to run the multiplier into a counter 6. This forward rotation of the operating member 5 acts through suitable gearing to run the gear 3 of the sum train forward and to run the gear 4 of the difference train backward.

The net result is that the gear 3 of the sum train is operated forward in proportion to the sum of the numbers indicated by the counters 2 and 6 and the gear 4 is operated forward in proportion to the difference of the numbers indicated by the counters 2 and 6. If the difference is negative, however, the gear 4 is thrown out of operation at zero and the gear 4a is made effective.

The gear 3 acts upon the squaring gear 7 to operate a gear 8 in proportion to the square of the sum of the numbers indicated by the counters 2 and 6, while the gear 4 acts through a squaring gear 9 to operate a gear 10 in proportion to the square of the difference of the numbers indicated by the counters 2 and 6. Through differential gearing these operations of the gears 8 and 10 are differentially combined to operate a gear 11 which, in turn, drives a gear 12 for rotating a product indicating counter 13. The counter 13 indicates one-quarter of the difference of the squares and hence the product of the numbers run into the counters 2 and 6.

The operating handle 1 is desirably fast upon a shaft 14 which carries a bevel gear 15 which acts on a bevel gear 16 for driving number wheels of the counter 2. The shaft 14 has fast upon it a gear 17 which meshes with a gear 18 loose upon a shaft 19. The gear 18 has fast with it a bevel gear 20 which meshes with bevel gears 21 and 22 of a differential train. A further gear 23 also loose upon the shaft 19 has driving connection with gears 21 and 22 through a bevel gear 23a. The gear 23 meshes with a gear 24 fast upon a shaft 25, the operating member 5 being fixed upon the shaft 25. Any suitable provision may be made for preventing retrograde rotation of the shafts 14 and 25 except at times when such rotation is desired for the purpose of setting the mechanism back to zero or of running in a number negatively. During the forward rotation of the operating member 1 the gear 24 may be assumed to be fixed. This prevents rotation of the gear 23 and hence compels the gears 21 and 22 to travel not only about their own axes but also about the axis of the shaft 19. The shafts 26 upon which the gears 21 and 22 are journalled are carried by a block 27 fixed to the shaft 19 so that the gears in travelling about the axis of the shaft cause the shaft to rotate. It will be seen that rotation of the operating handle 1 in a clockwise direction turns the gear 18 in a counter-clockwise direction and results in a turning of the shaft 19 in a counter-clockwise direction and in proportion to the turning of the gear 18.

When the gear 17 is held stationary and the gear 24 is turned clockwise by the operating handle 5, the gear 23 is turned counter-clockwise and this also results in turning the shaft 19 counter-clockwise and in proportion to the turning of the gear 24. The numbers run into the counters 2 and 6 are, therefore, additively combined in the rotation of the shaft 19.

The rotation of the operating handle 1 is also run positively into a shaft 28 similar to the shaft 19. Clockwise rotation of the gear 17 drives a meshing gear 29 counter-clockwise and this, in turn, drives a gear 30 loose on the shaft 28 in a clockwise direction. A bevelled pinion 31 fast with the gear 30 acts upon differential pinions 32 and 33 which mesh with a pinion 34. The pinion 34 is loose on the shaft 28 but is fixed to a gear 35 which meshes with the gear 24. Assuming that the gear 24 and hence the gear 35 is held against rotation while the handle 1 is turned forward, the clockwise rotation of the gear 30 results in a rotation of the shaft 28 in clockwise direction in proportion to the rotation of the gear 30.

When the gear 30 is held stationary, however, and the gear 24 is turned clockwise by operation of the member 5 the resulting counter-clockwise rotation of the gear 35 causes the shaft 28 to be turned counter-clockwise. As a result of this subtractive combining of the operating members 1 and 5 in their effect upon the shaft 28, the net rotation of the shaft 28 is proportional to the difference of the numbers indicated by the counters 2 and 6.

The shaft 19 has fast upon it a gear 36 which, through gears 37 and 38, drives a gear 39 fast on a clutch sleeve 40. The clutch sleeve 40 is rotatably mounted upon a shaft 41 which shaft carries the gear 3. Normally the clutch sleeve 40 drives the gear 3 which in turn drives the squaring gear 7.

The squaring gear 7 is a spiral gear having teeth 41 affixed to it so as to extend in a spiral path. The teeth 41 are uniformly spaced to mesh with and drive a crown gear 42 which is slidably mounted upon a square shaft 43. The spiral gear acts both to rotate the crown gear 42 and to move the crown gear along the shaft 43 toward and from the center of the spiral gear. As the crown gear moves away from the center of the spiral gear its rotation relative to the rotation of the gear 3 is increased, the shape of the spiral being so chosen that the rotation of the gear 42 is in proportion to the square of the rotation of the gear 3. The gear 8, which is fast upon the shaft 43 is, therefore, driven in proportion to the square of the rotation of the gear 3. Features of construction of the gears 7 and 9 will be described at a later point in this specification.

The other train of mechanism in which the numbers are subtractively combined, comprises a gear 44 fast on the shaft 28 which, through similar mechanism, normally drives the gear 10 so that the rotation of the gear 10 is in proportion to the square of the rotation of the gear 4. This train of mechanism comprises gears 45 and 46, a gear 47 fast on a clutch sleeve 48, the gear 4a, gears 4b and 4c, the squaring gear 9, a crown gear 49, and a square shaft 50, the gear 10 being fast upon the shaft 50. The clutch gears 39 and 47 are neutral at zero. They differ in the fact that the positive position of the gear 39 is down and the negative position is up, whereas the reverse condition holds true of gear 47.

The gears 8 and 10 are connected through differential mechanism to drive a gear 11 in opposite directions. Gears 8 and 10 mesh respectively with gears 52 and 53 (Figs. 1 and 3) both rotatably mounted upon a horizontal shaft 54. The gears 52 and 53, respectively, have fixed to them bevelled pinions 55 and 56, both of which pinions mesh with beveled pinions 57 and 58. The pinions 57 and 58 are revolubly mounted upon a shaft 59 which comprises a central block portion 60 fixed to the shaft 54.

The operation of a differential gear of this kind is well understood. When the gears 52 and 53 turn at the same speed in opposite directions, the pinions 57 and 58 merely turn about the axis of shaft 59 without causing the shaft to change its angular position relative to the axis of the shaft 54. When the gears 52 and 53 are turned at the same speed in the same direction they cause the shaft 54 to turn in unison with themselves. When one of the gears 52, 53 is turned and the other is held stationary, the shaft 54 is caused to turn in the same direction as the gear which is turning but at half the rotary speed of the gear. The simultaneous turning of the gears 52 and 53 at different speeds either in the same or opposite directions has the same final effect on shaft 54 as if the same turning movements were applied to the two gears successively, each being held stationary while the other is being turned.

When a number is run into the counter 2 through the handle 1, (the reading of the counter 6 being zero) the spiral gears 7 and 9 are turned in the direction to carry the crown gears 42 and 49 away from the centers of the spiral gears. This turns the bottom of the gear 10 away from the observer as seen in Fig. 1 and the bottom of the gear 8 toward the observer as seen in Fig. 1. The gears 52 and 53 are, therefore, operated equally in opposite directions so that the shaft 54, and hence the gears 11 and 12, remain stationary. The counter 13 therefore remains at zero. In the meantime if the number run into the counter 2 is called $a$, the crown gears 42 and 49 will both have been operated to positions on the spiral gears corresponding to $a^2$. If now a number $b$, which is less than $a$, is run in by the handle 5 the crown gear 42 will be moved further outward to a position corresponding to $(a+b)^2$. The rotation imparted to the gear 8 will be in a direction to drive the counter 13 forward and in an amount equal to $$\frac{(a+b)^2-a^2}{4}$$

and the rotation imparted to the gear 53 will be in a direction to drive the counter 13 forward and in an amount equal to $$\frac{a^2-(a-b)^2}{4}$$

The net result on the counter is obviously, therefore, $$\frac{a^2+2ab+b^2-a^2}{4}+\frac{a^2+2ab-b^2-a^2}{4}$$

or $ab$.

The desired result having been indicated and utilized, the mechanism may all be set back to zero by turning the handles 1 and 5 backward until the counters 2 and 6 read zero.

Since the mechanism will frequently be employed, however, in a place like a gasoline filling station where the price of gasoline (the multiplicand) remains the same for a considerable time, there is no occasion nor necessity for setting the counter 2 back to zero at all. It may be left standing at the current price per gallon of gasoline. The normal positions of the gears 42 and 49 will then correspond to the square of this price, but the indicator 13 will read zero so long as the counter 6 reads zero. The handle 5 may be replaced by gearing connecting the shaft 25 to the gasoline pump through suitable clutch mechanism which causes the shaft 25 to be rotated forward in proportion to the amount of gasoline delivered but which permits the shaft to be uncoupled from the pump for setting back to zero. Suitable mechanical or electrical means, such as a spring motor or an electromagnetically operated pawl and ratchet mechanism, may be provided, if desired, for turning the shaft 25 to set the counters 6 and 13 back to zero upon the mere pressing of a button or trip by the operator.

While the above description has been on the assumption that the handle 1 is operated first, the apparatus operates in the same manner if the handle 5 is operated first. Starting from a condition in which all the counters stand at zero the only difference would be that the clutch 48 would shift to its negative or down position immediately upon the beginning of the operation. The spiral gear 49 would be operated away from the center as before so that at the conclusion of the turning of the handle 5 both of the crown gears 49 and 42 would stand at positions corresponding to the square of the number turned in. In view of the reverse connections as compared with the operation first described, the subsequent turning of the handle 1 would have precisely the same effect upon the gears 42 and 49, and the mechanism which they jointly control, as that described in the turning of the handle 5 after the handle 1.

While it is immaterial which handle is used for running in the larger number and also immaterial which handle is operated first, for the purpose of explaining the function and operation of the reversing mechanism it will be assumed first that both numbers are positive, that the smaller number is run in first by means of the handle 1, and that the operation is started with all counters standing at zero.

Immediately upon the beginning of the forward revolution of the handle 1 the clutch 48 is shifted up and the clutch 40 is shifted down by mechanism which will be described presently. As has already been explained the complete operation of the handle 1 will cause the gears 42 and 49 to stand at their positions corresponding to the square of the number run in by the handle 1. Now as the larger number is run in by the handle 5 the gear 42 continues to move out and takes up a position corresponding to $(a+b)^2$. So long as the clutch 48 remains down, gear 49 moves in toward the center of the spiral gear 9 until it reaches its original or zero position. At that point the clutch 48 is shifted upward so that the direction of drive of the spiral gear 9 is reversed. The gear 49 is, therefore, driven outward again from the center through the remainder of the operation and finally comes to rest at a position corresponding to $(a-b)^2$ which, of course, is the same position which would be occupied for $(b-a)^2$. Since the counter 13 always reflects the difference of position of the gears 42 and 49, the correct absolute value of the product will obviously be shown by the counter 13.

The mechanism may also be used for dealing with negative numbers and to this end the reversing clutch 40 is provided. The first effect of the backward turning of the handle 1 from zero will be to shift the clutch 40 to its upper position so that the gear 42 will be driven outward from the center of the spiral gear. From what has already been said with reference to the operating parts and with reference to the principle of operation it is thought that the manner in which the correct product is secured will be apparent and that a detailed analysis of the operation and of the principle of carrying it out will be unnecessary.

Briefly, however, the gear 42 always stands, when both handles 1 and 5 have been fully operated, at the position corresponding to the square of the algebraic sum of the quantities run in, and the gear 49 always stands at a position corresponding to the square of the algebraic difference of the quantities run in. The differential mechanism combines these operations so as to subtract the latter square from the former, and by a mere matter of gear ratios is caused to divide the difference by 4. The division, however, may, of course, occur farther back toward the source, and if it occurs in advance of the gears 7 and 9 the division will be by 2 instead of 4.

The reversing mechanism for the clutch 48 is driven from a bevel pinion 61 fast on the shaft 28. The pinion 61 drives a pinion 62 which is mounted on a drive shaft 63 of what may be an ordinary counter mechanism 64 of the Veeder type in which the number wheels can be operated in either direction. This mechanism is not intended to give any information to the operator so that the numbers may be omitted and the wheels may be entirely enclosed. In fact, the gearing alone is important. For the purpose of making the principle of the reversing mechanism clear, however, it may be assumed that it consists of a counter comprising a series of decimal number wheels in which the sight opening would be at the side facing the observer in Fig. 1. The highest denomination wheel 65 is outside the capacity of the apparatus. That is to say, if the apparatus is adapted to deal with numbers running into the hundreds, the wheel 65 will be a thousands denomination wheel. No amount of forward rotation which will ever occur would influence or affect this wheel to carry it over from zero to 1. The counter would normally read if visible 0000. If the counter were turned backward one step from zero, however, there would be a carry over to all wheels and the counter would read 9999. If it then operated forward one step it would again read 0000. In other words, the wheel 65 operates from 0 to 9 when the counter goes backward from zero, and from 9 to 0 when the counter goes forward to zero. The wheel 65 has fixed upon it a clutch shifting fork 66 and from what has been said it will be apparent that the fork is shifted down when the counter 64 is operated backward from zero and is shifted up when the counter is operated forward to zero. The clutch includes pins 67 for engaging in recesses of the gear 4 and pins 68 for engaging in recesses of the gear 4a. Since the shift always occurs at exactly the same rotative position, alignment of the pins with the appropriate recesses is always assured.

The recesses are formed with flaring mouths to assist in guiding the pins. The pins enter the mouths of one set of recesses before leaving the mouths of the other set, so that faulty operation caused by overthrow or slight inaccuracies of timing is avoided.

The reversing mechanism for the clutch 40 may be substantially identical with the reversing mechanism for the clutch 48. This mechanism is driven from a pinion 69 fast on the shaft 19. The reversing mechanism may be assumed to be a counter exactly like the counter 64 but in which the sight opening would be on the side away from the observer in Fig. 1, so that if an observer went around to the far side and a sight opening were present he would see the units wheel at his right. As the device is viewed in Fig. 1, however, the units wheel is on the left and the direction of forward rotation is such that the tops of the wheels travel toward the observer. The wheel of highest denomination has fast upon it a clutch shifting fork 70. It will be apparent that the movement of the counter from 9999 to 0000 would carry the clutch fork 70 downward so that the down position is the positive position of the clutch 40. A change from 0000 to 9999 would carry the fork 70 upward so that the up position would be the negative position of the clutch 40.

The mechanism can obviously be used for division as well as for multiplication. This is done by first setting one of the counters 2 or 6, say 2, to show the known divisor, and then operating the other counter, 6, until the known dividend appears in counter 13. The quotient is then read from counter 6.

A description of the construction and design of the squaring gears 7 and 9 has been left for last in order to avoid digressing from the exposition of the principle of operation of the apparatus.

Figure 6:
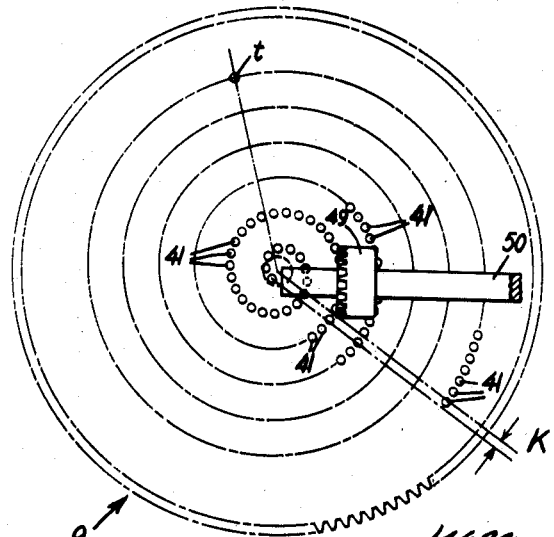
Fig. 6 is a fragmentary diagrammatic, plan view showing a squaring gear and associated parts.

The gears 7 and 9 are alike so that a description of one of them will apply to either. The diagram of Fig. 6 is marked as representing the gear 9 but applies equally to the gear 7.

The primary requirement in constructing one of these gears is that the effective radius of the spiral shall increase in direct proportion to the angle through which the gear is turned from zero. This is necessary in order to make the output a function of the square of the input. The gear teeth 41 are located at substantially equal linear distances along the spiral gear to mesh with the uniformly spaced crown gear teeth.

The gear teeth 41 are individual elements in the form of studs set in holes drilled in the face of the gear 7.

A central tooth would be bodily immovable and, therefore, would be meaningless since it would not move transversely of the axis of the spur gear and hence would impart no drive to the spur gear. It would simply be in the way and would impose unnecessary dimensional limitations upon the spacing of the crown gear teeth and the spiral gear teeth. Hence no central tooth is provided.

Any arbitrary distance from the center might be selected for the innermost tooth of the spiral. The radius of this innermost tooth stands at right angles to the direction of the axis of the spur gear in the zero position, and the spur gear is driven exclusively by this single tooth during the first quarter turn of the spiral. This results in an output of some small quantity. Since the spiral must have the characteristic that its radius increases in direct proportion to the angle of rotation from zero, it is evident that if the radius of the first tooth is called K and this tooth represents ¼ turn, then the radius at ⅝ revolutions must be 5K ... at ⅞ revolutions, 9K ... at 1¾ revolutions, 13K, etc. In other words, the distance K of the first tooth from the center is ¼ of the distance between adjacent turns of the spiral.

Since the distance between adjacent turns of the spiral is uniformly equal to 4K, the crown gear can be, and desirably is, made thick enough to be engaged and guided by the teeth of the spiral turn next outside and turn with which the crown gear is in mesh.

It is desirable that the output during the first ¼ turn shall approximate a square curve and that zero output shall occur at the zero position. During the first 90° of revolution the movement of the innermost tooth transversely of the axis of the shaft 43 is proportional to $1-\cos c$ (where $c$ is the angle of displacement from zero). Since $$1-\cos c = 2\sin^2 \frac{c}{2}$$

the movement of the first tooth transversely of the axis of the crown gear is proportional to the square of the sine of ½ the angle of displacement from zero. The sine of an angle does not depart greatly from a straight line function of the value of the angle between 0° and 45°. The transverse movement of the first tooth does not, therefore, depart greatly in value from the square of the angle of rotation of the spiral gear.

It is a fact, however, that the angle increases more rapidly than the sine, that is, the slope of a sine curve diminishes somewhat as the angle increases. It should be noted, however, that the spiral gear tooth moves in the plane of a chord of the crown gear. The angle of rotation of the crown gear, therefore, is not directly proportional to the movement of the first spiral gear tooth transversely of the crown gear axis. On the contrary, the shaft 43 and the crown gear have their axes so related to the axis of the spiral gear that the rotation of the crown gear in relation to the movement of the first spiral gear tooth transversely of the crown gear axis is the reciprocal of a sine curve. This relation has a corrective effect and tends to make the output, that is the rotation of the crown gear, more nearly proportional to the square of the angle of rotation of the spiral gear during the first 90° of turning.

The relationship referred to is secured by causing the axis of the crown gear to pass, not through the axis of the spiral gear, but at a distance from the axis of the spiral gear equal to K. Thus in the zero position the first tooth of the spiral gear stands in the axial vertical plane of the crown gear and as it moves across the crown gear it moves away from the central vertical plane.

This displacement of the crown gear axis relative to the axis of the spiral gear has another important advantage. While the teeth after the first tooth of the spiral gear travel in driving relation with the crown gear at both sides of its axial vertical plane, the driving travel on the left side of the vertical plane is relatively short as compared with the travel on the right side. Thus, assuming a uniform rate of rotation of the gear 7 the tendency of a pin is to accelerate the crown gear. This is particularly true because each spiral gear tooth moves into engagement with the crown gear through the face of the crown gear and with a substantial component of movement in the direction of the axis of the crown gear and a relatively slight component transversely of the crown gear axis, but leaves the crown gear through the periphery of the crown gear and at a time when the radius of the spiral gear tooth extends substantially parallel to the crown gear axis. The displacement of the crown gear axis has a further advantage in connection with the fact that the crown gear must at times be simultaneously engaged by two teeth of the spiral gear. The tooth of longer radius comes into engagement with the crown gear at a time when it has a substantial component of movement in the direction of the axis of the crown gear whereas the preceding tooth of shorter radius is at the same time moving more nearly at right angles to the axis of the crown gear. There is not, therefore, at any time any substantial disparity in the rates at which the two adjacent teeth tend to drive the crown gear.

For the purpose of constructing a spiral gear embodying the principle of the present invention the following formulas will be useful as a guide. Symbols used in the formulas have the following meanings:

$P$=diametral pitch of gear teeth
$T$=total number of gear teeth
$t$=the number in the series of any specific tooth on the spiral pitch line, tooth No. 1 being nearest the center of the gear.
$N$=total number of revolutoins of the gear.
$R$=radius of final tooth, i. e., the maximum radius of the spiral.
$r$=radius of tooth $t$.
$c$=angle of tooth $t$ from the zero point on the spiral gear.
$K$=offset of first tooth and of the axis of the crown gear shaft 43 from the center of the spiral gear.

In designing the spiral gear the first step is to assume desired values for N and R.

The mean radius of the spiral is $$\frac{R}{2}$$

The length of the spiral is $$\frac{2\pi NR}{2}$$

The number of teeth for any diametral pitch can be obtained by dividing this last quantity by $$\frac{\pi}{P}$$

$$\therefore T = \frac{2\pi NR/2}{\frac{\pi}{P}} = NRP$$

$$c = 360N\sqrt{\frac{t}{T}} \text{ (since } \% \text{ input} = \sqrt{\% \text{ output}}\text{)}$$

$$r = \frac{cR}{360N} = R\sqrt{\frac{t}{T}}$$

Since the first derivative of a square function is a straight line function, $r$ is proportional to the square root of $$\frac{t}{T}$$

$K = r$ for the first 90° of cam travel, therefore, $$K = \frac{90R}{360N} = \frac{R}{4N}$$

We have described what we believe to be the best embodiments of our invention. We do not wish, however, to be confined to the embodiments shown, but what we desire to cover by Letters Patent is set forth in the appended claims.

We claim:

1. Variable ratio gearing comprising a flat input gear having the teeth thereof arranged in a spiral path, an output follower gear of uniform radius in mesh therewith, said spiral gear teeth arranged to produce a progressively changing output-input ratio between said gears, and means supporting the follower gear with its axis extending parallel to the plane of the spiral gear and disposed at one side of the axis of the spiral gear.

2. Variable ratio gearing comprising a flat input gear having the teeth thereof arranged in a spiral path, an output follower gear of uniform radius in mesh therewith, said spiral teeth arranged to produce a progressively changing output-input ratio between said gears, including an output-input ratio of zero, and means supporting the follower gear with its axis extending parallel to the plane of the spiral gear and disposed at one side of the axis of the spiral gear, the innermost tooth of the spiral gear being spaced from the center of the spiral gear in position to travel axially of the follower gear and in engagement therewith when the output-input ratio is zero.

3. Variable ratio gearing comprising a flat input gear having the teeth thereof arranged in a spiral path, an output follower gear of uniform radius in mesh therewith, said spiral gear teeth arranged to produce a progressively changing output-input ratio between said gears, and means supporting the follower gear with its axis extending parallel to the plane of the spiral gear and disposed at one side of the axis of the spiral gear, the innermost tooth of the spiral gear being spaced from the center of the spiral gear in position to align with the follower gear axis when the output-input ratio is zero.

WILLIAM L. MAXSON.
PETER J. McLAREN.